(No Model.)
G. S. JONES.
COMBINED SAW FILER, GAGE, AND GUMMER.
No. 377,677. Patented Feb. 7, 1888.
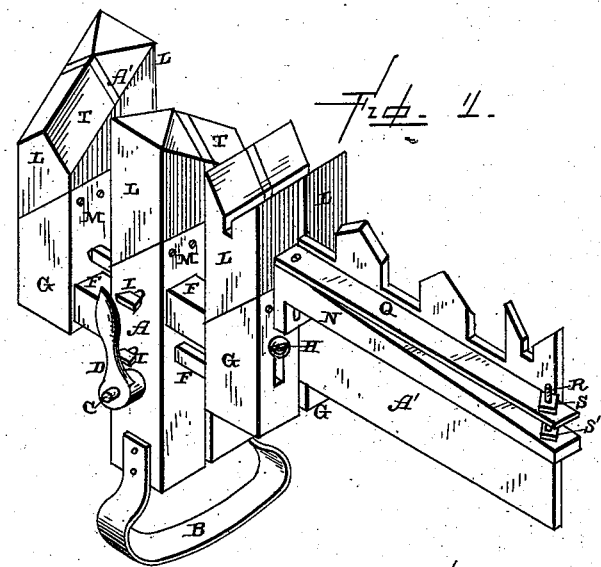
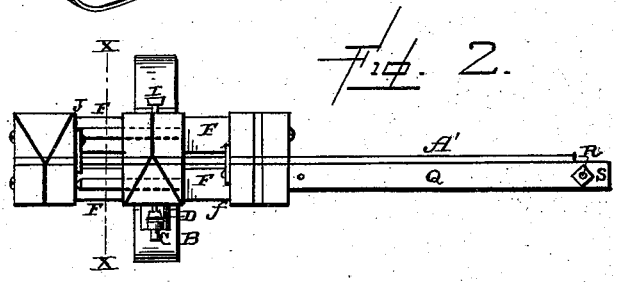
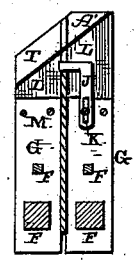
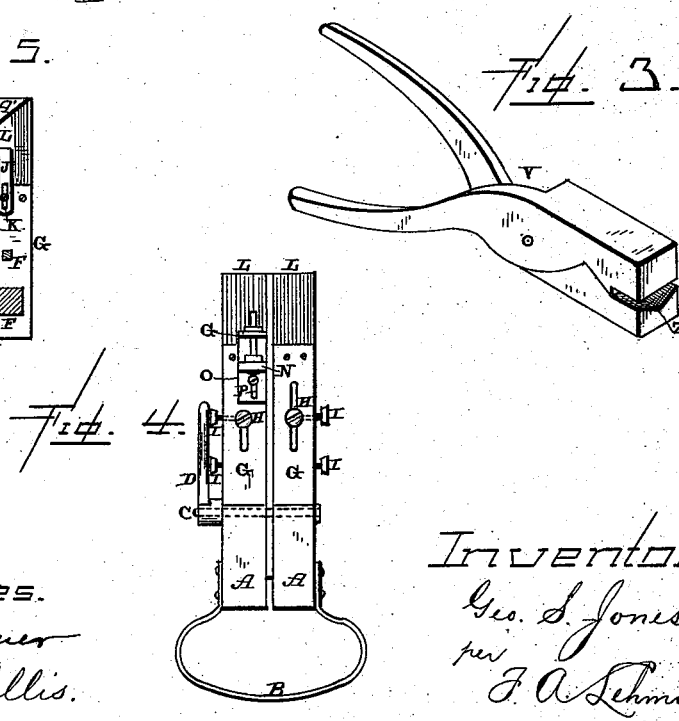
Witnesses.
L. F. Gardner
Edm. P. Ellis.
Inventor.
Geo. S. Jones,
per
F. A. Lehmann,
Atty.

UNITED STATES PATENT OFFICE.

GEORGE S. JONES, OF LACONIA, INDIANA.

COMBINED SAW FILER, GAGE, AND GUMMER.

SPECIFICATION forming part of Letters Patent No. 377,677, dated February 7, 1888.

Application filed September 29, 1887. Serial No. 251,043. (No model.)

*To all whom it may concern:*

Be it known that I, GEORGE S. JONES, of Laconia, in the county of Harrison and State of Indiana, have invented certain new and useful Improvements in a Combined Saw Filer, Gage, Gummer, and Set; and I do hereby declare the following to be a full, clear, and exact description of the invention, such as will enable others skilled in the art to which it pertains to make and use it, reference being had to the accompanying drawings, which form part of this specification.

My invention relates to an improvement in a combined saw sharpener, gage, gummer, and set; and it consists in, first, the combination of a clamp in which the saw is secured and which has teeth corresponding in shape with the saw-teeth, and which form guides while the teeth are being sharpened, the teeth having a horizontal adjustment, whereby they can be used upon saws of different sizes; second, the combination of a clamp in which the saw is secured and which has teeth capable of vertical and horizontal adjustment, the teeth corresponding in shape with the teeth of the saw; third, the combination, with a clamp in which the saw to be sharpened is secured, of a gummer-gage secured thereto and extending horizontally therefrom parallel with the saw; fourth, the combination, with a clamp in which the saw to be sharpened is secured, of a gummer-gage extending horizontally therefrom parallel with the saw and which is provided with a spring adapted to be sprung or bent to correspond with the curve of the saw; fifth, in the arrangement and combination of devices to be more fully described hereinafter, and pointed out in the claims.

The object of my invention is to provide a combined saw sharpener, gage, gummer, and set which can be secured directly to the blade of a saw, which has adjustable teeth corresponding in shape with the saw-teeth, so as to form guides while the saw is being filed, and whereby the device can be used upon saws having teeth of varying distance apart; to provide detachable teeth, so that teeth of varying shapes can be attached thereto; to provide a gummer-gage which can be made to correspond with the curve of the saw, and to so shape the guides that the saw-teeth can be set by means of a pair of pinchers.

Figure 1 is a perspective of my invention. Fig. 2 is a top plan view. Fig. 3 is a perspective of the pinchers used. Fig. 4 is an end view. Fig. 5 is a vertical section taken on the line X X of Fig. 2.

The supporting or main standards A have secured to their lower ends the spring B, which keeps them separated, and with the bolt C, which passes through their lower ends, and provided with the screw-handle D, by means of which they are clamped to the saw E, which is placed between their upper ends.

The two center standards A are provided with horizontal holes through which the inner ends of the four connecting-bars F pass, and to the outer and enlarged ends of which are secured the four teeth G, by means of the screws H, which pass through vertical slots made in the teeth G. The inner ends of the connecting-bars F are held in any desired adjustment in the center standards A, by means of the set-screws I, which screw into the standards and have their inner ends to bear against the bars F.

Secured to diagonally-opposite teeth G are the L-shaped catches J, which have their hooked ends to catch over the top of the saw, and are provided with vertical slots K and set-screws whereby they may be adjusted vertically, so as to bring the tops of the teeth G in any desired vertical relation to the tops of the saw-teeth. The upper ends, L, of the standards A and teeth G are made of very hard steel, so that the file will not cut them, and are secured thereto by means of the screws M. By means of this arrangement the tops of the teeth G and standards A may be detached at any time and others of a different shape secured thereto, according to the shape of the teeth of the saw that is being sharpened.

A gummer-gage, N, is secured to one of the teeth G, preferably the outer right-hand one, and extends horizontally therefrom, parallel to the saw, for any desired distance. The inner end of the gummer-gage has the downwardly-projecting portion O, provided with the vertical slot P, and a set-screw, by means of which it can be set at any desired vertical adjustment in relation to the upper edge of the saw. Fastened at its inner end to the inner upper side of the casting N, (which forms the gummer-gage,) and extending over its top, is the spring Q. Passing through the outer ends of the casting N and the spring Q is the threaded bolt R, having the two nuts S S'. The object of this spring Q is to make it correspond to the curve of the saw, which is being gummed and sharpened, and thereby insure a symmetry in shape of the upper edge of the saw.

The blade of the saw A' is clamped between the standards A and teeth G, so as to bring the first three teeth of the saw alongside of the gummer-gage, the gage set at any desired distance below the lower edges of the teeth, as shown, the spring Q bent as required to correspond to the curve of the saw, the teeth then cut down even with the spring, and then the blade moved forward until those teeth which have just been gummed are even with the teeth G and standards A, which have previously been adjusted vertically by means of the hooks J, so as to allow the teeth of the saw to project slightly above them, the teeth then set, as hereinafter described, and filed down even with the teeth G and standards A, and this operation continued until the teeth are all gummed and sharpened, always gumming before sharpening.

I here show the upper ends of the standards A and teeth G, of a shape suitable for sharpening crosscut-saws, and in which case the upper ends of the standards A and one set of teeth G being beveled away, as shown at T, in reverse directions, the teeth can be set by means of the pinchers V, which have one jaw provided with a V-shaped slot, Z, to correspond with the cut-away portions T, and its opposite jaw made flat to rest upon the outer surface of the teeth and standards. By applying the pinchers, as above described, the teeth can be set, (which is done, as above described, before sharpening, while their ends project above the teeth and standards.)

Having thus described my invention, I claim—

1. In a saw-sharpening device, a clamp in which the saw is secured, and which has teeth to correspond with the shape of the saw-teeth, the teeth being capable of adjustment relative to the saw-teeth, for the purpose described.

2. In a saw-sharpening device, the combination of center standards which form a clamp, and teeth which correspond in shape with the teeth of the saw to be sharpened, and which are capable of horizontal adjustment thereto, substantially as described.

3. In a saw-sharpening device, the combination of center standards, between which the saw is placed, a bolt passing through the standards, and a screw-handle applied to the bolt for clamping the saw, and a spring secured to the lower end of the standards for the purpose of separating them, and teeth arranged in suitable relation to the center standards, which form guides while filing the saw-teeth, substantially as shown.

4. The combination of the center standards in which the saw is clamped, and vertically-adjustable teeth connected therewith, which form guides for sharpening the saw, substantially as set forth.

5. The combination of the center standards in which the saw is clamped, teeth suitably connected therewith, which form guides for sharpening the saw, and supporting catches secured thereto for catching over the upper edge of the saw, and which are provided with vertical slots and set-screws, whereby they can be adjusted vertically, substantially as specified.

6. The combination, with a saw-sharpening device which is clamped directly to the saw-blade, of a vertically-adjustable gummer gage secured thereto, and which extends parallel with the saw, substantially as described.

7. The combination, with a saw-sharpening device, of a gummer-gage secured thereto and extending parallel to the saw, and a spring applied to its upper side, and provided with a bolt for bending the spring to correspond to the curve of the upper edge of the saw, substantially as set forth.

8. The combination of the standards A, in which the saw is clamped, the bars F, having their inner ends to pass through the standards, and set-screws for securing the bars therein, and the teeth G, secured to their outer ends by means of the screws H, and the vertical slots in the teeth G, through which the screws H pass, substantially as shown.

9. In a saw-sharpening device, the combination of the standards A and the teeth G, provided with the detachable portions L, substantially as shown and described.

In testimony whereof I affix my signature in presence of two witnesses.

GEORGE S. JONES.

Witnesses:
DARIUS LEMMON,
GRANT JONES.